United States Patent

[11] 3,626,287

[72] Inventor Anthony J. Di Niro
 Bergen County, N.J.
[21] Appl. No. 797,788
[22] Filed Feb. 10, 1969
[45] Patented Dec. 7, 1971
[73] Assignee C.G.I. Corporation
 Hackensack, N.J.

[54] SYSTEM FOR RESPONDING TO CHANGES IN CAPACITANCE OF A SENSING CAPACITOR
 7 Claims, 3 Drawing Figs.

[52] U.S. Cl. .................................................. 324/61 R, 330/85
[51] Int. Cl. .................................................. G01r 27/26
[50] Field of Search ........................................ 324/61 CO, 61 S, 61 TK; 330/85, 107, 110

[56] References Cited
 UNITED STATES PATENTS
 3,034,044 5/1962 Konigsberg .................... 324/57
 3,048,775 8/1962 Calvert ......................... 324/61

*Primary Examiner*—Edward E. Kubasiewicz
*Attorney*—Lilling and Siegel

ABSTRACT: Capacitive transducer system utilizing capacitive probe connected in feedback loop of operational amplifier provided with shielding system to convert capacitive changes at the probe to linear voltage changes for display by a voltmeter with the system being isolated and shielded from the effects of stray capacity.

PATENTED DEC 7 1971

INVENTOR.
ANTHONY J. DiNIRO

BY *Rachewach & Lingel*

ATTORNEYS

SYSTEM FOR RESPONDING TO CHANGES IN CAPACITANCE OF A SENSING CAPACITOR

This invention relates to transducer systems and, more particularly, to capacitive transducer systems producing a linear output independently of stray capacity.

A primary object of the present invention is the provision of a capacitive transducer system providing a linear voltage output unaffected by and isolated from the effects of stray capacity.

Another primary object of the present invention, in addition to the foregoing object, is the provision of such systems which are suitable for use with long connecting cables between the probe and the amplifier.

Another primary object of the present invention, in addition to each of the foregoing objects, is the provision of such systems which are substantially independent of the driven frequency.

Yet still further, it is another primary object of the present invention, in addition to each of the foregoing objects, to provide such systems utilizing a novel arrangement of guards, driven shields and isolated power supplies to provide linear operation thereof.

Another and yet still further primary object of the present invention, in addition to each of the foregoing objects, is the provision of such systems utilizing broadband, high-gain operational amplifiers as the signal-conditioning portion thereof.

Yet further, it is still another primary object of the present invention, in addition to each of the foregoing objects, to provide such systems wherein an operational amplifier is utilized to drive shielding thereof. Yet further, it is another primary object of the present invention, in addition to each of the foregoing objects, to provide such systems which are economical, reliable and efficient in use.

The invention resides in the combination, construction, arrangement and disposition of the various component parts and elements incorporated in improved capacitive transducer systems constructed in accordance with the principles of this invention and in the methods incorporated therein.

The present invention will be later understood and objects and important features other than those specifically enumerated above will become apparent when consideration is given to the following details and description, which when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved, especially as they fall within the scope and spirit of the subjoined claims.

IN THE DRAWING

Figure 1:
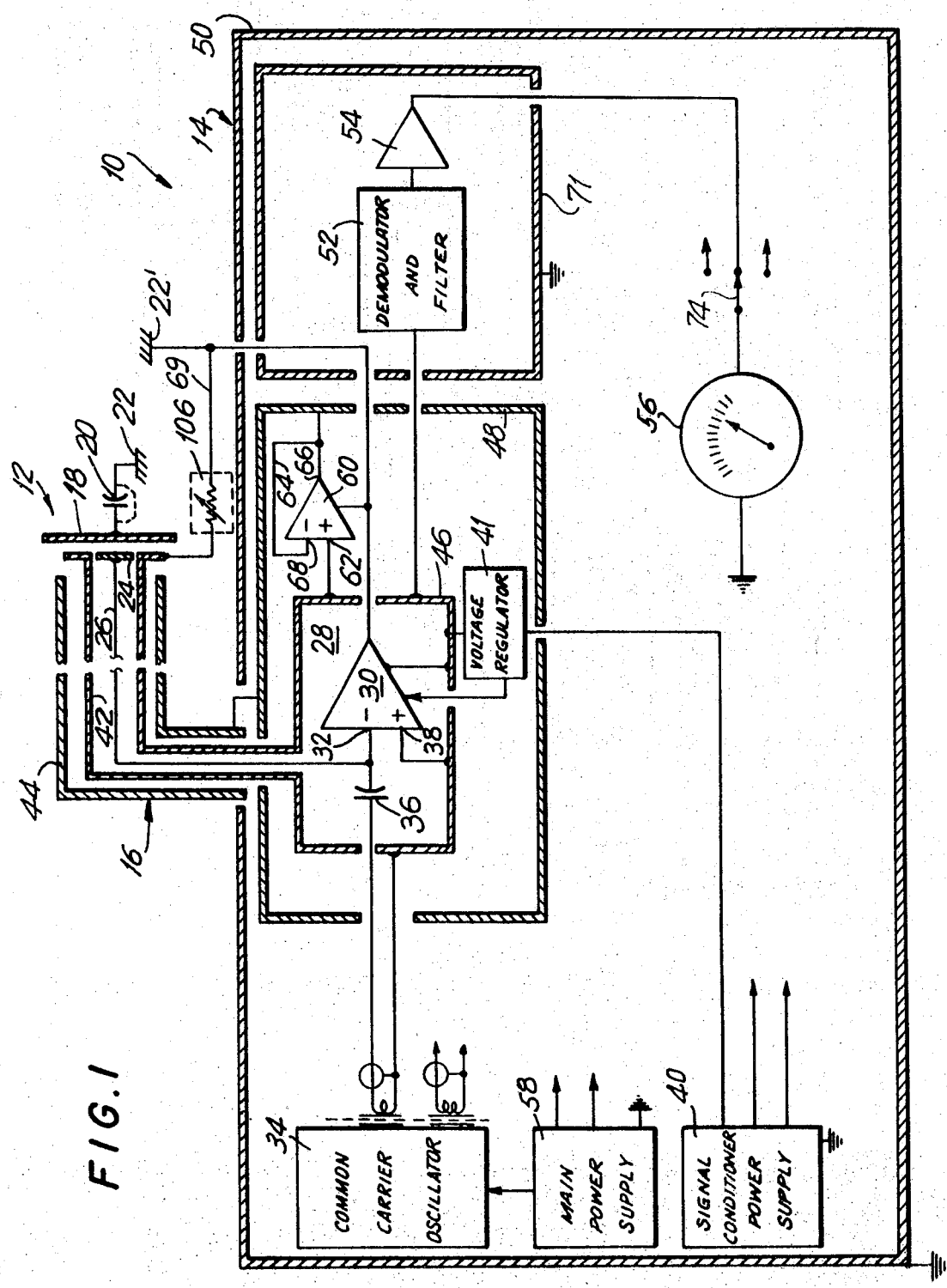
FIG. 1 is a schematic diagram of the capacitive transducer system of the present invention.
Figure 3:
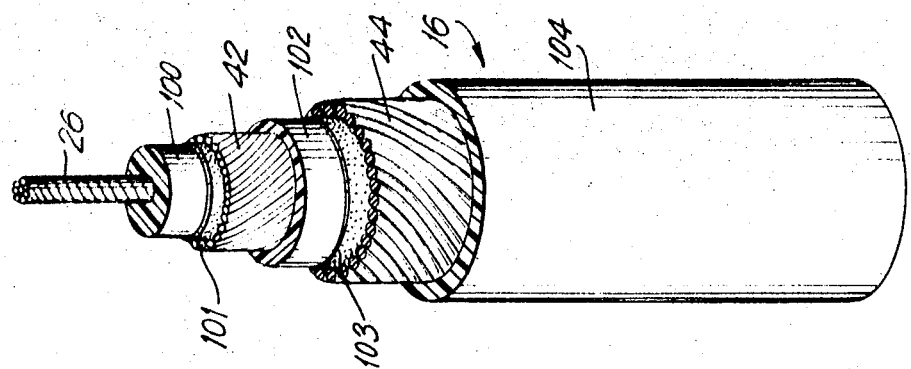
FIG. 3 is a pictorial representation of a cable for connecting the signal conditioner to a capacitance-type probe in accordance with the present invention.

While the present invention may be utilized to provide a linear indication proportional to any small capacitance, it is particularly suitable to indicate relative spacing or changes of spacing between a movable and a fixed, or a pair of relatively movable capacitive plates such as may be utilized to indicate substantially any physical parameter such as size, pressure, distance, vibration, flow force, torsion, temperature, weight, and the like. The particular parameter being measured, however, does not form a part of the present invention and, therefore, the probe for responding to the desired parameter will not be described further except, and with reference now to the drawing, to define the system 10 as comprising a probe 12 for providing a capacitive change from a fixed zero condition; a signal converter 14 for responding to the capacitance of the probe and providing an instrumented response thereto; and a triaxial cable 16 connecting the probe 12 with the signal converter 14.

For the purposes of illustration, the probe 12 depicted is one utilized to indicate or measure small distances between the plates thereof with one plate 18 thereof being connected, either directly or through a capacitor 20 of at least 0.05 microfarad to an earth or other suitable ground 22 and with the other plate or probe electrode 24 being connected with the central conductor 26 of the triaxial cable 16. In other words, the probe may actually act as one plate of a capacitor and the earth as the second plate so that as the probe or probe electrode 24 is moved closer or farther away from the earth, the capacitance will change. This then gives an indication of the change in distance between the plates of the capacitor or between the probe plate 24 and earth or ground 22.

The probe electrode or plate 24 is connected, through the central conductor 26 of the triaxial cable 16 to a signal conditioner 28 which transduces the variable capacitance into an alternating-current voltage, directly proportional to capacitive reactance and linear with respect to the gap between the plates 18 and 24. More particularly, the signal conditioner 28 comprises a broadband, high-gain, solid-state operational amplifier 30 and the central conductor 26 of the triaxial cable 16 is connected to the input terminal 32 of the operational amplifier 30. The output of the operational amplifier 30 is connected to another ground 22'. Accordingly, the probe capacitor, comprising the plates 18 and 24 is therefore placed in series with the minumum 0.05-microfarad capacitor 20 across the feedback path of the operational amplifier 30. There is also connected to the input terminal 32 of the operational amplifier 30, a low impedance to guard, low capacitance or high impedance to ground, amplitude stable carrier oscillator 34 connected with the input terminal 32 through a highly stable coupling capacitor 36.

Accordingly, the input terminal 32 defines a summing junction for the oscillator signal from the oscillator 34 and the feedback signal from the probe capacitor 12.

Ignoring all parasitics, and assuming the operational amplifier 30 to have infinite gain, the output voltage $E_0$ equals minus $E_1 (X_f/X_c)$ where $X_f$ is equal to the feedback reactance, $E_1$ is equal to the oscillator output voltage and $X_c$ is equal to the fixed capacitive reactance (taken at oscillator frequency).

However, parasitics cannot be ignored, and the effects of such parasitics, such as capacitive earth loading on the center conductor 26 and on the probe plate 24 can produce nonlinearities and oscillations. In order for complete earth isolation to exist at these points along the cable and the probe, negligible potential difference can be tolerated along the entire cable length. This is difficult if not impossible to achieve with conventional guarding techniques. It has been heretofore suggested to take advantage of the small signal difference existing between the input terminals of high-gain amplifiers to maintain the shield or guard at the same potential as the summing junction. While this condition would hold true for short cable lengths with negligible impedance and, therefore, in theory, complete isolation of earth or noise would be effected with respect to the inner conductor, such a situation does not hold true for long cable lengths.

Firstly, as a cable length increases, the guarding or isolation decreases since there is a finite impedance to the inner conductor and a voltage drop across its length. The current in the guard is due to leakage parasitics and is therefore entirely different from the current in the inner conductor. The different potential drops along the inner conductor and guard produces increased potential difference therebetween as the cable length increases which deteriorates the guarding or shielding effect. As a result of this, ground "see-through" to the inner conductor severely curtails the linearity of the system since it in effect shunts the capacitive probe.

Since the output of the operational amplifier 30 is connected to ground, the common input 38 must be extremely well isolated from ground. The common mode impedance of the operational amplifier 30 is extremely high owing to the use of a field-effect transistor (FET) in the input stage. Nevertheless, any ground which appears at the summing junction 32 will be in effect in shunt with the probe capacitance. In order to facilitate this isolation, the power supply which drives the operational amplifier 30, or the signal conditioner power supply 40, preferably comprises a specially wound transformer with low primary to secondary leakage capacitance. When more that one channel is driven, the capacitance between power supplies must also be necessarily low.

The high impedance to ground of the guard prevents noise with respect to ground from being effectively shunted to ground. Similarly, the same reasoning and precaution must be taken with reference to the oscillator 34 which drives one of many channels. Isolation between oscillator ground and interchannel isolation may be achieved by means of low primary to secondary winding capacitances. Interchannel windings must also provide low capacitances. The oscillator 34, therefore, does not require any special shielding other than ground shields to prevent line excitation modulation.

In the present invention, the difficulties discussed above, namely, (a) ineffectual guarding, (b) high-impedance guarding with respect to earth, and (c) inner conductor voltage drop are minimized to the point of not effecting linearity by several techniques. Among these are (a) triaxial construction of amplifier housing, (b) driving the outermost shield of the triaxial cable and the housing with a driver exhibiting low impedance to ground characteristics, and (c) providing compensation feedback to the probe and to the long cable guard shield.

With further reference now to the drawings, both the cable 16 and the signal converter 14 are of a triaxial shielded construction. In other words, the cable 16 comprises the inner conductor 26, an inner shield 42 and an outer shield 44. The signal converter 14 comprises an inner shield 46 disposed to completely contain therewithin the signal conditioner 28 which comprises the operational amplifier 30 and the coupling capacitor 36 and an outer shield 48. The cable inner shield 42 is electrically connected with the converter inner shield 46 and the cable outer shield 44 is electrically connected with the converter outer shield 48. The entire signal converter 14, including the power supplies and readout devices are contained within a grounded casing 50 primarily to conform with accepted industry safety standards and to preclude physical and/or environmental damage; to preclude shock hazards; and to contain a physical malfunctioning, including any electrical fire hazard.

The inner shields 42 and 46 are connected with the common input 38 of the operational amplifier 30, as well as being common to the signal conditioner power supply 40 and providing an output to a demodulator and filter 52 feeding into an output amplifier 54 for driving an indicator device, such as a meter 56. As believed readily apparent, substantially any output or indication system may be utilized in substitution for the demodulator and filter 52, output amplifier 54 and meter 56, including both analog and digital readout devices.

A voltage regulator 41 may be disposed within the outer shield 48 and electrically connected between the signal conditioner power supply 40 and the operational amplifier 30 to provide a stable regulated voltage thereto. Yet further, a main power supply 58 may be provided within the grounded casing 50 to provide power to the common carrier oscillator 34, demodulator 52 and output amplifier 54.

As heretofore pointed out, the inner shields 42 and 46 are connected with the common input 38 of the operational amplifier 30. The outer shields 44 and 48 are electrically connected with one another and may be driven by means of an operational amplifier 60 having its common input 62 connected with the inner shields 42 and 46. The driver amplifier 60 may be a solid-state operational amplifier having a feedback loop 64 connected between the output 66 and the input 68 thereof, with the output 66 being connected with the outer shields 44 and 48.

The driven triaxial shield and housing provides a true non-current-carrying guard whose potential is almost as precise as the input signal to guard relationship. The driver 60 provides a low impedance to ground. The input signal to driver amplifier 60 is guard potential and the driver amplifier 60 has a high common mode impedance to the common terminal 62. The driver amplifier 60 yet further has a reasonably high common mode impedance between the driver input 68 and the common input 62 and the common or low side of the driver is connecter to the main amplifier output, which is ground. The main power supply 58, which is a grounded power supply, may therefore be used to excite the triaxial driver amplifier 60.

Noise signals with respect to ground and capacitive coupling between the triaxial shield and the housing will not affect the inner guard. Noise will therefore be even further removed from the inner conductor.

The compensation feedback along the loop 69 to the inner guard 46 reestablishes proper guard potential at the furtherest end of the cable. In addition, a proportional amount of signal is injected through to the inner conductor to compensate for potential drops in the long cable. Since the oscillator voltage is amplitude regulated [constant], the net effect of this potential drop is a greater signal at the summing junction 32 (the feedback voltage is in phase opposition to the oscillator voltage). The signal conditioner's output also increases. Through this system, therefore, the potential drop appears as if the effective capacitances decreased thereby increasing $X_f$. Needless to say, if uncorrected, the linearity of the system would be destroyed. The adversity of this effect is proportional to cable length. In order to bring the system back into equilibrium, the summing junction voltage 32 must be decreased, thereby decreasing output voltage of conditioner 28. This is accomplished by the variable compensator 106.

In the present invention, in other words, the oscillator need not be guarded and system feedback capacitive reactance can tolerate as much as a 0.05-microfarad capacitance in series with the earthed lead. Yet further, the coupling capacitor 36 of the present invention may be of any convenient value, the only criticality relating thereto is that it must be stable. Since the operational amplifier 30 of the present invention is a broadband amplifier, rather than a tuned amplifier whose characteristics are dependent upon frequency, the frequency of the oscillator 34 is not critical and a slight amount of drift therein may even be tolerated without adversely affecting the operation of the system.

Figure 2:
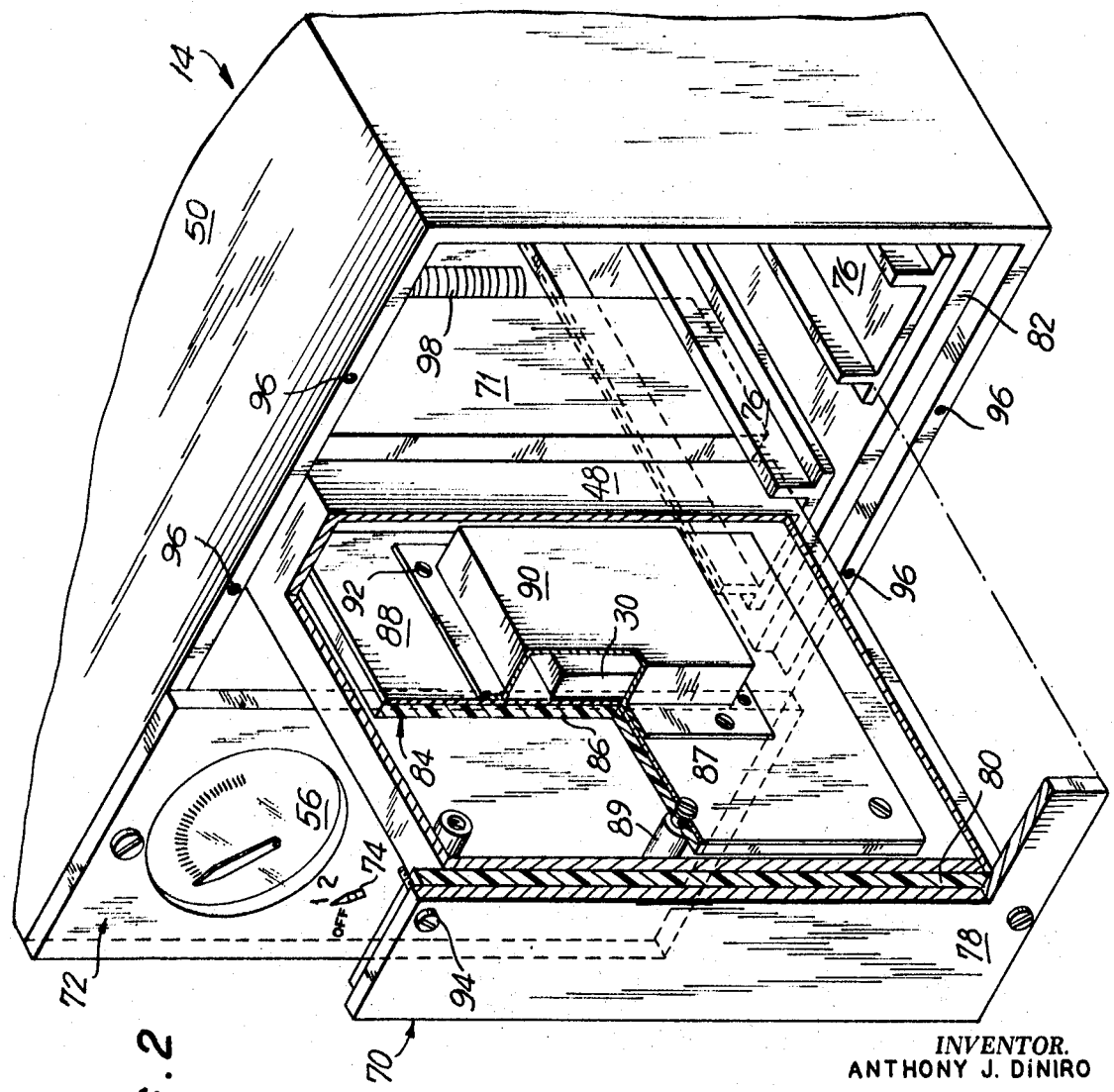
FIG. 2 is a pictorial illustration of a capacitive transducer system constructed in accordance with the principles of the present invention.

The system 10, the signal conditioner 28 and associated circuitry, including the voltage regulator 58 and driver amplifier 60 associated therewith or, on other words, all of the structure for each channel within the outer shield 48 may be physically mounted as plug-in modules as indicated by the reference character 70 in FIG. 2 adapted for removable, plug-in association with the housing 50. The housing 50 may be configured to enable plug-in association therewith of a plurality of channel modules 70 which, together with the shield 48 and components disposed therewithin may comprise an individual demodulator and filter 52 and output amplifier 54 for each channel contained within a grounded shield 71. Yet further, the remaining components of the signal converter 14, such as the oscillator 34, main power supply 58, signal conditioner power transformer 40 and meter movement 56 or, in other words, the components common to all channels may be structurally associated in a plug-in common module 72. The common module 72 may further comprise switch means 74 to connect the output meter 56 with the amplifier 28 of the desired one of the channel modules 70.

The housing 50 may comprise a plurality of module tracks for slidably receiving the channel and common modules 70 and 72, the outer shields 48 of the channel modules being slidably receivable therein. A cover plate 78 may be provided on each channel module 70 structurally associated with and insulated from the outer shields 48, as by means of an insulator or spacer 80 disposed therebetween. The module tracks 76 may be fabricated of either electrically conductive or insulative mater and, if manufactured of conductive material may be mounted with and electrically isolated from the housing 50, as by means of an insulator plate or spacer 82.

A laminated board 84 having an insulative portion 86 and a conductive coating 88 may be structurally associated with the outer shield 48, as by means of screws 87 and insulated standoffs or studs 89. A generally open-bottomed box-shaped cover portion 90 may be structurally associated with the board 84, as by means of screws 92, with the amplifier 30 and capacitor 36 being disposed therebetween, to, together with the conductive layer 88 of the board 84 define the inner shield 46. The voltage regulator and driver amplifier 60 may be mounted on the board 84 so as to be physically within the confines of the outer shield 48. The module 70 may be structurally associated with the housing 50 by engagement of the outer shield 48 with the slides 76 and retained in position relative thereto as by means of screws 94 extending through the cover plate 78 for engaging threaded apertures 96 provided in the housing 50. A module 70 may be electrically connected with the common module 72 as by means of connectors 98 structurally associated with the rear portion of the modules for engaging mating connectors mounted on the interior of the housing 50 upon insertion of the modules 70 therein. The common module 72 may be mounted with the housing 50 in a similar manner.

The central conductor 26 of the triaxial cable 16 may comprise a single, solid conductor or may comprise a plurality of standard conductors, as shown, separated from the inner shield 42, as by means of a layer of rubber or plastic insulation 100 and carbon-impregnated filler 101. The inner shield 42 may similarly be of solid or standard construction and may comprise a plurality of strands twisted around the inner insulation layer 100, as shown, or may comprise a braided wire layer. The inner and outer shields 42 and 44 may be separated, as by means of a layer or plastic insulation 102 and carbon-impregnated filler 103 and the outer shield 44 may, similar to the inner shield 42, by of a solid, stranded or braided configuration. Yet further, there may be provided an outer protective layer of rubber or plastic insulation 104 extending entirely exteriorly of the outer shield 44.

Yet further, at the pulled end of the triaxial cable 16, there may be provided a compensator comprising, for example, a trimmed resistor having a value, for example, of approximately 25,000 ohms connected between the pulled end of the inner shield 42 and the earth ground 22' to yet further stabilize the system 10 and isolate the system 10 from the effects of stray capacitance.

While the invention has been described, disclosed, illustrated and shown in terms of an embodiment or modification which it has assumed in practice, the scope of the invention should not be deemed to be limited by the precise embodiment or modification herein described, disclosed, illustrated or shown, such other embodiments or modifications as may be suggested to those having the benefit of the teachings herein being intended to be reserved specially as they fall within the scope and breadth of the claims here appended.

What is claimed is:

1. A system for responding to changes in capacitance of a sensing capacitor as may be produced by variations in the spacing between a plurality of electrically conductive members separated by a dielectric and producing potential differences linearly proportional thereto, said system comprising, in combination, broadband operational amplifier means, means for exciting said amplifier means with a carrier signal having a substantially constant amplitude envelope, electric connection circuit means for connecting the capacitor in a feedback loop around said amplifier means between input and output terminals thereof so that changes in capacitance will modulate and vary the output of said amplifier means, said connection circuit means providing a potential, and shielding means for providing isolation from stray capacitances, said shielding means comprising an outer electrically conductive guard electrode substantially enclosing at least said amplifier means and said electric connection circuit means, and separate driver amplifier means for driving said outer guard electrode at said potential of said electric connection circuit means so that stray capacitances and electric fields will not introduce nonlinearities.

2. A system as defined in claim 1 wherein said operational amplifier means having a further common input and output terminal.

3. A system as defined in claim 2, wherein said driver amplifier means has the input thereof connected with said common terminal of said operational amplifier means.

4. A system as defined in claim 3, wherein said driver amplifier means comprises a further operational amplifier having infinite negative feedback so that the output potential thereof will remain substantially identical in amplitude to the input potential.

5. A system as defined in claim 2, further comprising an additional shield physically disposed generally inwardly of said outer guard electrode and electrically connected with said common terminal of said operational amplifier means.

6. A system as defined in claim 5, wherein said driver amplifier means has the input thereof connected with said common terminal of said operational amplifier means.

7. A system as defined in claim 6, wherein said driver amplifier means comprises a further operational amplifier having infinite negative feedback so that the output potential will remain substantially identical in amplitude to the input potential.

* * * * *